(12) United States Patent
Hirabara et al.

(10) Patent No.: US 8,019,206 B2
(45) Date of Patent: Sep. 13, 2011

(54) GLASS MANUFACTURING APPARATUS AND A STRUCTURAL MEMBER THEREOF

(75) Inventors: Yasuharu Hirabara, Yokohama (JP); Hajime Itoh, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 570 days.

(21) Appl. No.: 11/947,817

(22) Filed: Nov. 30, 2007

(65) Prior Publication Data

US 2008/0087046 A1 Apr. 17, 2008

Related U.S. Application Data

(63) Continuation of application No. PCT/JP2006/309033, filed on Apr. 28, 2006.

(30) Foreign Application Priority Data

Jun. 9, 2005 (JP) .................................. 2005-169169

(51) Int. Cl.
*H05B 6/54* (2006.01)
*H05B 3/60* (2006.01)
*C03B 5/225* (2006.01)
*C03B 7/06* (2006.01)
*C03B 7/07* (2006.01)

(52) U.S. Cl. ........... 392/323; 65/355; 219/59.1; 373/36; 392/314; 392/338; 392/480

(58) Field of Classification Search ...... 96/49; 219/780, 219/59.1; 313/30, 32; 373/36; 392/338, 392/232, 465, 478, 479, 480, 482, 314, 323; 65/355
See application file for complete search history.

(56) References Cited

U.S. PATENT DOCUMENTS

| 2,961,625 | A | * | 11/1960 | Sion | ................................ | 338/28 |
| 3,411,123 | A | * | 11/1968 | Kydd | ............................ | 338/318 |
| 4,180,723 | A | * | 12/1979 | Szupillo | ........................ | 219/541 |
| 5,851,258 | A |   | 12/1998 | Ando et al. | | |
| 6,286,337 | B1 | * | 9/2001 | Palmquist | ....................... | 65/157 |

FOREIGN PATENT DOCUMENTS

| JP | 06-227822 A | 8/1994 |
| JP | 10-152329 A | 6/1998 |
| JP | 11-349334 A | 12/1999 |

* cited by examiner

*Primary Examiner* — Matthew J Daniels
*Assistant Examiner* — Cynthia Szewczyk
(74) *Attorney, Agent, or Firm* — Oblon, Spivak, McClelland, Maier & Neustadt, L.L.P.

(57) ABSTRACT

A hollow tubular body for molten glass by which local-overheating in the electrode for conduction heating is prevented. A hollow tubular body for molten glass by which local-overheating in the electrode for conduction heating is prevented. A hollow tubular body having a platinum or platinum alloy hollow tube, used for conduction heating is characterized in that a ring electrode is joined to the outer circumference of the hollow tube, at least one lead-out electrode is joined to an outer edge of the ring electrode, and the ring electrode comprises a core portion of electrode of platinum or platinum alloy and a thick portion of platinum or platinum alloy or of a metallic material other than platinum or platinum alloy, provided at an outer side of the core portion of electrode.

13 Claims, 2 Drawing Sheets

GLASS MANUFACTURING APPARATUS AND A STRUCTURAL MEMBER THEREOF

BACKGROUND OF THE INVENTION

1. Field of the Invention

The present invention relates to a hollow tubular body having a platinum or platinum alloy hollow tube, suitable for a conduit for molten glass of a glass manufacturing apparatus, wherein an electrode for conduction heating is joined to the outer circumference of the hollow tube.

The present invention relate to a method for heating the hollow tubular body of the present invention by conduction heating.

The present invention relate to a glass manufacturing apparatus employing the hollow tubular body as a conduit for molten glass and a method for producing glass.

2. Discussion of Background

In a glass manufacturing apparatus, a hollow tube made of platinum or a platinum alloy such as a platinum-gold alloy or a platinum-rhodium alloy is employed for a conduit in which molten glass of high-temperature is passed.

In a molten glass feeding apparatus described in JP-A-6-227822 for example, a platinum or platinum alloy pipe is connected to a molten glass outlet located in a lower portion of the glass melting tank. As other examples of the conduit for feeding molten glass, there are a discharge pipe provided to remove impurities from a glass manufacturing apparatus, a discharge pipe for feeding molten glass from a glass manufacturing apparatus to a molding die in order to form an optical element such as lens, prism or the like.

In the glass manufacturing apparatus, the conduit in which molten glass is passed is heated in order to adjust the temperature of the molten glass. There is a case that the conduit is heated from the outside by means of a heat source such as a heater or the like. However, in the case of a platinum or platinum alloy hollow tube, it has been popularly practiced to provide an electrode on the hollow tube to carry out conduction heating.

FIG. 4 is a perspective view showing a conventional platinum or platinum alloy hollow tube provided with an electrode for conduction heating. In FIG. 4, a ring electrode 200 is joined to the outer circumference of a cylindrical hollow tube 100. Two lead-out electrodes 300, 301 are joined to outer edges of the ring electrode 200 so as to oppose each other.

The hollow tube 100, the ring electrode 200 and the lead-out electrodes 300, 301 are made of platinum or a platinum alloy. The hollow tube 100 shown in FIG. 4 is connected to an external power source (not shown) via the lead-out electrodes 300, 301 and is heated by feeding a current from the external power source.

The inventors of this patent application have found that when the hollow tube 100 as shown in FIG. 4 is heated by conduction heating, the current is concentrated to a specified portion of the electrode 200 whereby this portion is subjected to local-overheating. This will be explained in more detail.

In FIG. 4, when the lead-out electrodes 300, 301 are connected to the external power source to carry out conduction heating, a current flows from the lead-out electrodes 300, 301 through the electrode 200 to the hollow tube 100. The ring electrode 200 is with intent of feeding the current uniformly in the whole portion of the hollow tube 100. However, the current from the lead-out electrodes 300, 301 is concentrated to specified portions of the electrode 200.

The current flows through the shortest path according to its characteristic of conduction. In the case of the hollow tube 100 shown in FIG. 4, the current from the lead-out electrodes 300, 301 passes through the shortest path indicated by arrow marks, with the result that the current flowing in the electrode 200 converges at specified portions (portions indicated by dotted lines) of the electrode 200. The portions indicated by the dotted lines of the electrode 200 are subjected to local-overheating due to convergence of the current. The occurrence of such local-overheating may destroy the electrode 200 due to a thermal stress. If the electrode 200 is destroyed, conduction heating to hollow tube 100 becomes impossible whereby there causes a temperature difference between the molten glass and the hollow tube and it is difficult to produce glass.

Further, when the current converges at a specified portion in the electrode 200, the current flowing from the electrode 200 to the hollow tube 100 converges also at a specified portion in the hollow tube 101. Specifically, the current converges at the joint portion indicated by the dotted lines, to the electrode 200 in the circular joint portion to the electrode 200. When the current converges at the specified portion of the hollow tube 100, that portion is subject to local-overheating whereby the hollow tube may be damaged due to a thermal stress or the quality of molten glass passing through the hollow tube 100 may change.

SUMMARY OF THE INVENTION

The present invention has been achieved on the basis of such finding and it is an object of the present invention to provide a hollow tubular body having a platinum or platinum alloy hollow tube by which local-overheating in the electrode for conduction heating can be prevented. The hollow tubular body of the present invention is suitable for a conduit for molten glass in a glass manufacturing apparatus.

It is an object of the present invention to provide a method for heating the hollow tubular body by conduction heating.

It is an object of the present invention to provide a glass manufacturing apparatus employing the hollow tubular body as a conduit for molten glass and a method for manufacturing glass.

In order to achieve the above-mentioned objects, the present invention is to provide a hollow tubular body having a platinum or platinum alloy hollow tube, used for conduction heating, the hollow tubular body being characterized in that a ring electrode is joined to the outer circumference of the hollow tube, at least one lead-out electrode is joined to an outer edge of the ring electrode, and the ring electrode comprises a core portion of electrode of platinum or platinum alloy and a thick portion of platinum or platinum alloy provided at an outer side of the core portion of electrode.

Further, the present invention is to provide a hollow tubular body having a platinum or platinum alloy hollow tube, used for conduction heating, the hollow tubular body being characterized in that a ring electrode is joined to the outer circumference of the hollow tube, at least one lead-out electrode is joined to an outer edge of the ring electrode, and the ring electrode comprises a core portion of electrode of platinum or platinum alloy and a thick portion made of a metallic material other than platinum or platinum alloy, provided at an outer side of the core portion of electrode.

In the hollow tubular body of the present invention, it is preferred that the thick portion is provided over the whole circumference of the ring electrode.

In the hollow tubular body of the present invention, it is preferred that the thick portion satisfies the following formulas (1) and (2):

$$t_1 = t_0 \text{ to } 20t_0 \quad (1) \text{ and}$$

$$w = 0.02r \text{ to } 0.3r \quad (2)$$

where $t_1$ represents the wall thickness (mm) of the thick portion,
$t_0$ represents the wall thickness (mm) of the hollow tube,
w represents the width (mm) of the thick portion and
r represents the radius (mm) of the ring electrode.

In the hollow tubular body of the present invention, it is preferred that the core portion of electrode comprises a first thin portion in the joint portion to the lead-out electrode and in the vicinity thereof, said first thin portion having a smaller wall thickness than the other portion along a circumferential direction of the core portion of electrode.

In the hollow tubular body of the present invention, it is preferred that the first thin portion is formed with an angle in a range of from 10° to 90° with respect to a linear line, as the center line, extending from the center of the ring electrode to the midpoint of the joint portion to the lead-out electrode.

In the hollow tubular body of the present invention, it is preferred that the first thin portion and the other portion along a circumferential direction of the core portion of electrode satisfy the following formulas (3) to (5):

$$t_2 = t_0 \text{ to } 5t_0 \quad (3)$$

$$t_3 = 2t_0 \text{ to } 20t_0 \quad (4) \text{ and}$$

$$t_3 > t_2 \quad (5)$$

where $t_0$ represents the wall thickness (mm) of the hollow tube,
$t_2$ represents the wall thickness (mm) of the first thin portion and
$t_3$ represents the wall thickness (mm) of the other portion along a circumferential direction of the core portion of electrode.

In the hollow tubular body of the present invention, it is preferred that the core portion of electrode further comprises a second thin portion over its whole circumference in the joint portion to the hollow tube and in the vicinity thereof, said second thin portion having a smaller wall thickness than the other portion of the core portion of electrode.

In the hollow tubular body of the present invention, it is preferred that the angle at each edge of the joint portion of the lead-out electrode to the ring electrode is from 110° to 180°.

In the hollow tubular body of the present invention, it is preferred that the difference between the wall thickness of the ring electrode and the wall thickness of the lead-out electrode in the joint portion is not more than 50% of the wall thickness of the ring electrode or the wall thickness of the lead-out electrode, whichever greater.

The present invention is to provide a molten glass manufacturing apparatus employing any of the hollow tubular bodies, as a conduit for molten glass, described above.

The present invention is to provide a sub-atmospheric apparatus employing any of the hollow tubular bodies, as a conduit for molten glass, described above.

The present invention is to provide a method for heating any of the hollow tubular bodies by conduction heating, described above.

The present invention is to provide a method for producing glass including feeding molten glass into a conduit in a glass manufacturing apparatus, the method being characterized in that any of the hollow tubular bodies described above is employed as a conduit.

DETAILED DESCRIPTION OF THE PREFERRED EMBODIMENT

The present invention will be described with reference to the drawings.

Figure 1:
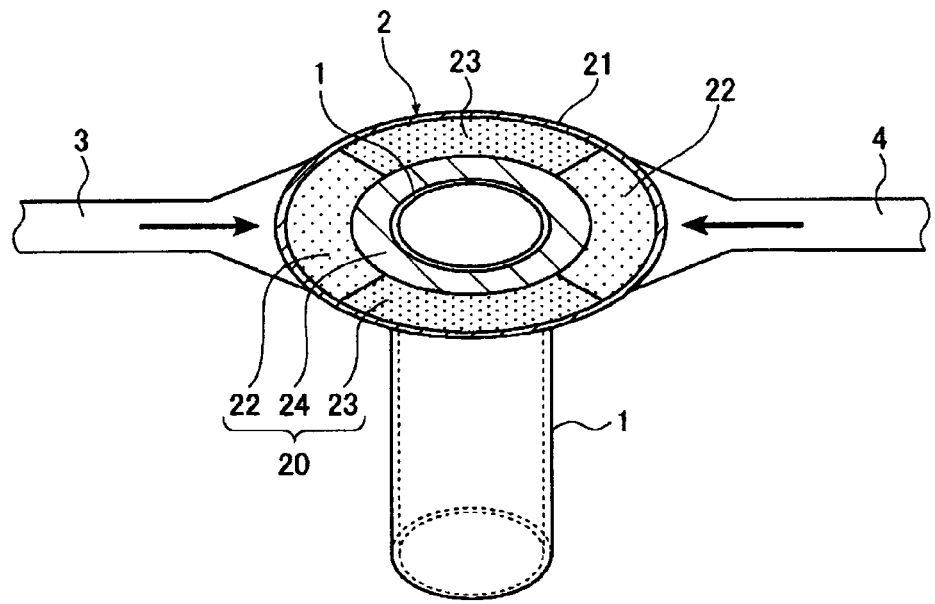
FIG. 1 is a perspective view showing an embodiment of the hollow tubular body having a platinum or platinum alloy hollow tube according to the present invention.

FIG. 1 is a perspective view showing an embodiment of the hollow tubular body having a platinum or platinum alloy hollow tube according to the present invention.

In FIG. 1, the hollow tube 1 is a cylindrical hollow tube made of platinum or a platinum alloy. An electrode 2 is joined to the outer circumference of the hollow tube 1. The electrode 2 is a ring electrode having an opening at its center in order to insert the hollow tube 1 and has a circular outline. The electrode 2 is made of platinum or a platinum alloy and is joined to an upper end of the hollow tube 1. In FIG. 1, portions of the electrode 2 having different wall thicknesses are shaded.

Lead-out electrodes 3, 4 are joined to outer edge portions of the electrode 2 to connect the electrode to an external power source (not shown). The lead-out electrodes 3, 4 are joined to the outer edge portions of the electrode 2 so as to oppose each other. Each of the lead-out electrodes 3, 4 has a sectorial shape having a widened region in the vicinity of the joint portion to the electrode 2. In conduction heating of the hollow tube 1, the lead-out electrodes 3, 4 are connected to the external power source (not shown) to feed a current in directions of arrow mark.

Figure 2:
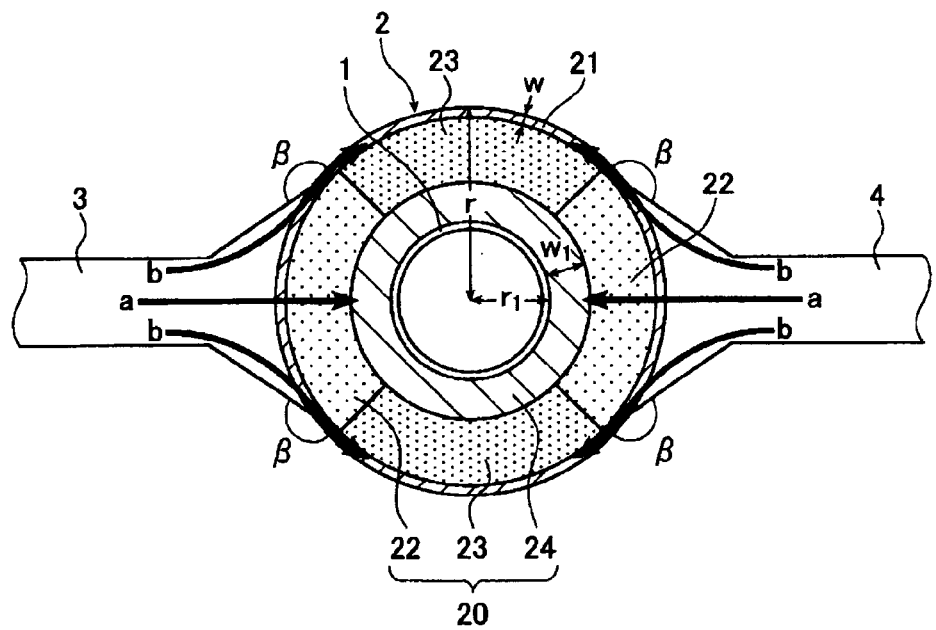
FIG. 2 is a diagrammatic upper plan view of the hollow tubular body shown in FIG. 1.

FIG. 2 is a diagrammatic upper plan view of the hollow tubular body shown in FIG. 1. In FIG. 2, the ring electrode 2 joined to the outer circumference of the hollow tube 1 comprises a core portion of electrode 20 and a thick portion 21 provided at an outer side of the core portion of electrode 20. In FIG. 2, the core portion of electrode 20 and the thick portion 21 are made of platinum or a platinum alloy. The thick portion 21 is provided over the whole circumference of the ring electrode 2 and has a larger wall thickness than the core portion of electrode 20. The electric resistance of a metallic material such as platinum or a platinum alloy is inversely proportional to a unit cross-sectional area of the material. Accordingly, the thick portion 21 has a smaller electric resistance than the core portion of electrode 20. Therefore, the current from the lead-out electrodes 3, 4 does not flow into the core portion of electrode 20 in the shortest path indicated by arrow marks a but flows to the thick portion 21 in a dispersed state along the circumferential directions of the electrode 2 as indicated by arrow marks b. As a result, the concentration of the current from the lead-out electrodes 3, 4 to the shortest paths indicated by the arrow marks a can be prevented. In this description, the shortest path indicated by an arrow mark a of a current from lead-out electrode 3 or 4 is expressed by "the shortest path indicated by an arrow mark a", and the concentration of the current to the shortest path indicated by an arrow mark a is expressed by "the concentration of a current to the shortest path indicated by an arrow mark a".

In the hollow tubular body of the present invention, the width and the wall thickness of the thick portion 21 are not particular limited as long as the concentration of the current to the shortest path indicated by an arrow mark a can be prevented, and they can be selected appropriately depending on the dimensions of the electrode 2, wall thicknesses of the other portions of the electrode 2 and so on. However, it is preferred that the thick portion 21 satisfies the following formulas (1) and (2):

$$t_1 = t_0 \text{ to } 20t_0 \qquad (1)$$

$$w = 0.02r \text{ to } 0.3r \qquad (2).$$

In the formula (1), $t_1$ represents the wall thickness (mm) of the thick portion 21 and $t_0$ represents the wall thickness (mm) of the hollow tube 1. In the formula (2), w represents the width (mm) of the thick portion 21 and r represents the radius (mm) of the electrode 2. When the thick portion 21 satisfies the above-mentioned formulas (1) and (2), the concentration of the current to the shortest path indicated by an arrow mark a can effectively be prevented. In the description, $t_1 = t_0$ to $20t_0$ represents $t_0 \leq t_1 20t_0$ and $w = 0.02r$ to $0.3r$ represents $0.02r \leq w \leq 0.3r$. Further, in the formulas other than the above-mentioned, the same definitions are applicable. The thick portion 21 satisfies more preferably the following formulas (6) and (7):

$$t_1 = 2t_0 \text{ to } 15t_0 \qquad (6) \text{ and}$$

$$w = 0.05r \text{ to } 0.2r \qquad (7).$$

The hollow tubular body of the present invention is characterized in that the ring electrode 2 joined to the outer circumference of the hollow tube 1 comprises the core portion of electrode 20 and the thick portion 21 provided at an outer side of the core portion of electrode 20. The structural elements described hereinbelow are optional structural elements. However, the hollow tubular body of the present invention is preferably provided with the structure described below.

In FIG. 2, the core portion of electrode 20 is provided with portions 22, 23 having different wall thicknesses along its circumferential direction. Specifically, a portion 22 in the core portion of electrode 20, adjacent to the joint portion to the lead-out electrode 3 or 4 and in the vicinity thereof is a portion having a smaller wall thickness (a first thin portion) than another portion 23 along a circumferential direction of the core portion of electrode 20. When the portion 22 including the shortest path indicated by an arrow mark a is formed to have a smaller wall thickness than another portion 23 along a circumferential direction of the electrode 2, the concentration of the current to the shortest path indicated by arrow mark a can further be prevented.

As described above, the electric resistance of the metallic material such as platinum or a platinum alloy is inversely proportional to a unit cross-sectional area of this material. Accordingly, the electric resistance of the portion 22 is greater than that of the portion 23. Therefore, a current from the lead-out electrode 3 or 4 can be distributed from the portion 22 via the thick portion 21 to the portion 23 whereby the concentration of the current to the shortest path indicated by an arrow mark a can be prevented.

Figure 3:
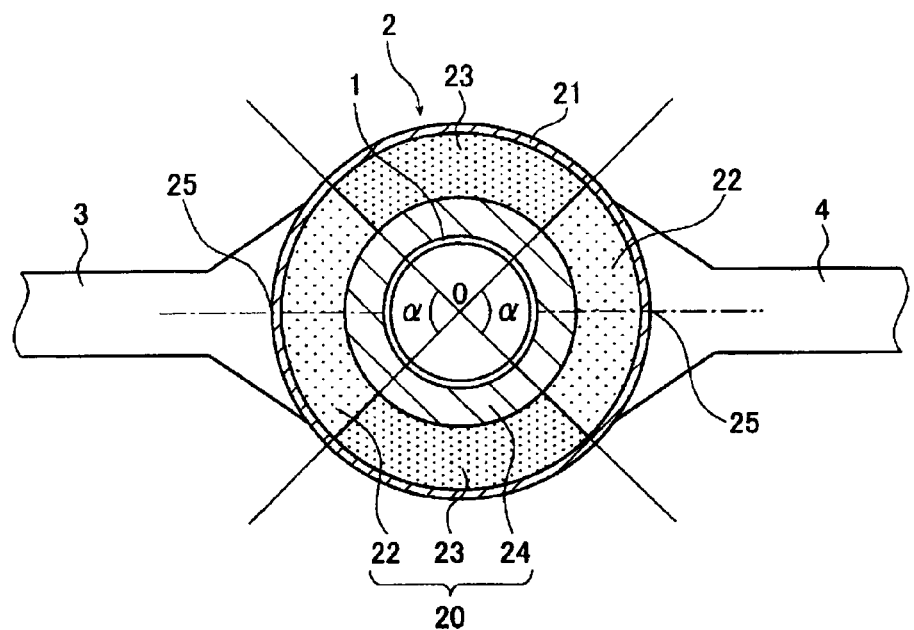
FIG. 3 is an upper plan view similar to FIG. 2 wherein the location of a portion 22 with respect to a linear line connecting the center of the electrode 2 to the midpoint 25 of the joint portion is shown.
Figure 4:
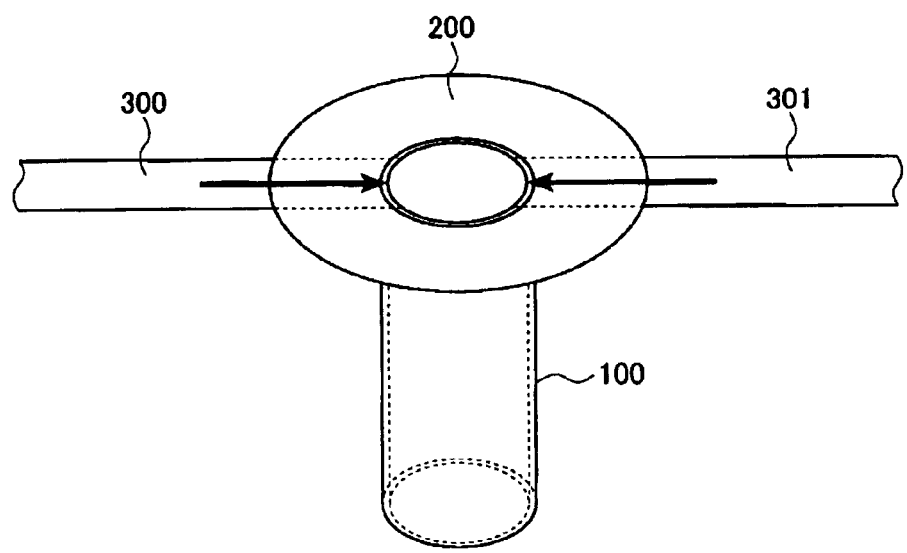
FIG. 4 is a perspective view of a conventional platinum hollow tube provided with an electrode for conduction heating.

The specified location or area of the portion 22 in the core portion of electrode 20 is not in particular limited as long as it is located in the joint portion to the lead-out electrode 3 or 4 and in the vicinity thereof, and it can be selected appropriately depending on dimensions of the electrode 2, the area of the joint portion to the lead-out electrode 3 or 4 and so on. However, it is preferably that as shown in FIG. 3, the portion 22 is located in an angular range a with respect to a linear line, as the center line, extending from the center O of the electrode 2, (the central portion 20 of the electrode) to the midpoint 25 of the joint portion (the median in the joint portion) to the lead-out electrode 3. The angle α should be from 10° to 90°, more preferably, from 20° to 60°. When the portion 22 is located within such angular range α, a current from the lead-out electrode 3 or 4 can sufficiently be distributed from the portion 22 via the thick portion 21 to the portion 23. As a result, the concentration of the current to the shortest path indicated by an arrow mark a can effectively be prevented.

It is preferable that the portion 22 and the portion 23 satisfy the following formulas (3) to (5):

$$t_2 = t_0 \text{ to } 5t_0 \qquad (3),$$

$$t_3 = 2t_0 \text{ to } 20t_0 \qquad (4) \text{ and}$$

$$t_3 > t_2 \qquad (5)$$

where $t_0$ represents the wall thickness (mm) of the hollow tube 1, $t_2$ represents the wall thickness (mm) of the portion 22 and $t_3$ represents the wall thickness (mm) of the portion 23.

When the portion 22 and the portion 23 satisfy the above-mentioned formulas (3) to (5), the current from the lead-out electrode 3 or 4 can sufficiently be distributed from the portion 22 via the thick portion 21 to the portion 23. As a result, the concentration of the current to the shortest path indicated by an arrow mark a can effectively be prevented. In this case, it is preferable that the wall thickness $t_1$ of the thick portion 21 is greater than $t_3$ from the viewpoint of distribution of current.

It is more preferable that the portion 22 and the portion 23 satisfy the following formulas (8) to (10):

$$t_2 = 2t_0 \text{ to } 5t_0 \qquad (8)$$

$$t_3 = 3t_0 \text{ to } 10t_0 \qquad (9), \text{ and}$$

$$t_3 = 1.2t_2 \text{ to } 3t_2 \qquad (10).$$

In FIG. 2, a thin portion (a second thin portion) 24 having a smaller wall thickness than the other portions (the portions 22, 23) in the core portion of electrode 20 is formed over its whole circumference in the area that occupies an inner circumferential side of the core portion of electrode 20, in the joint portion to the hollow tube 1 and in the vicinity thereof. When the thin portion 24 is formed over the whole circumference in the area of the joint portion to the hollow tube 1 and in the vicinity thereof, it is possible to prevent more effectively the convergence of current to the shortest path indicated by an arrow mark a.

As described before, the electric resistance of a metallic material such as platinum or a platinum alloy is inversely proportional to a unit cross-sectional area of the material. Accordingly, the electric resistance of the thin portion 24 is greater than that of each of the portions 22, 23 located at the outer circumferential side. Therefore, the current flowing from the lead-out electrodes 3, 4 via the thick portion 21 is distributed into the portions 22, 23 before passing through the thin portion 24, whereby the convergence of current to the shortest path indicated by an arrow mark a is avoidable.

The width and the wall thickness of the thin portion 24 are not in particular limited as long as the above-mentioned desirable effect is obtainable, and they can be selected appropriately depending on dimensions of the electrode 2, especially, the diameter of the opening formed at the center of the electrode 2 and wall thicknesses of the other portions in the core portion of electrode 20. However, the thin portion 24 preferably satisfies the following formulas (11) to (13):

$$t_4 = 0.7t_0 \text{ to } 2t_0 \quad (11),$$

$$w_1 = 0.05r_1 \text{ to } 0.5r_1 \quad (12) \text{ and}$$

$$t_4 < t_2 < t_3 \quad (13).$$

In formula (11), $t_4$ represents the wall thickness (mm) of the thin portion 24 and $t_0$ represents the wall thickness (mm) of the hollow tube 1. In formula (12), $w_1$ represents the width (mm) of the thin portion 24 and $r_1$ represents the radius (mm) of the opening formed at the center of the electrode 2. When the thin portion 24 satisfies the above-mentioned formulas (11) to (13), the effect by the thin portion 24 as described above can preferably be achieved.

FIG. 2 shows that each of the lead-out electrodes 3, 4 has a sectorial shape having a widened region in the vicinity of the joint portion to the electrode 2, so that the angle β at each edge of the joint portion of the lead-out electrode to the ring electrode 2 is from 110° to not more than 180°. The formation of the angle β to be from 110° to not more than 180° is preferred because local-overheating in the joint portions of the lead-out electrodes 3, 4 to the electrode 2 can be reduced.

When a current is fed to a metallic material such as platinum or a platinum alloy, the current converges at a portion having a substantial change in cross-sectional area of the material whereby local-overheating takes place.

The joint portions of the electrode 2 to the lead-out electrodes 3, 4, especially, abutting ends of the electrode 2 to the lead-out electrodes 3, 4 have a substantial change in cross-sectional area. If the angle β is less than 110°, the cross-sectional area at each abutting end changes substantially, whereby remarkable local-overheating takes places. When the angle β is 110° or more, the change in cross-sectional area at the abutting end is gentle, whereby the occurrence of local-overheating at the abutting end can be reduced. Thus, a sufficient reduction in local-overheating at each abutting end is obtainable, the angle β is preferably from 120° to not more than 180°, more preferably, from 130° to not more than 180°.

From the reason mentioned above, it is preferred that the joint portions of the electrode 2 to the lead-out electrodes 3, 4 have preferably such a structure that there is no substantial change in cross-sectional area. Accordingly, the difference between the wall thickness of the electrode 2 and the wall thickness of the lead-out electrode 3 or 4 in the joint portion is preferably small as possible. The difference between the wall thickness of the ring electrode 2 and the wall thickness of the lead-out electrode 3 or 4 in the joint portion is not more than 50%, more preferably, not more than 30% of the wall thickness of the ring electrode 2 or the wall thickness of the lead-out electrode 3 or 4, whichever greater. It is preferred that the wall thickness of the electrode 2 and the wall thickness of the lead-out electrode 3 or 4 in the joint portion is substantially same.

Even at each boundary area among the thick portion 21, the portion 22, the portion 23 and the thin portion 24, it is preferred to employ such a structure that there is no substantial change in cross-sectional area of these portions in the same manner as above.

FIG. 1 shows a circular cylindrical tube as the hollow tube 1. However, the shape of the hollow tube is not limited to this. For example, it may have an elliptical, quadrangle, hexagonal, octagonal or another polygonal shape in cross section.

Further, FIG. 1 shows the ring electrode 2 having a circular outline. However, the outline of the ring electrode is not limited to this. For example, it may have an elliptical, quadrangle, hexagonal, octagonal or is another polygonal shape.

In FIG. 1, the ring electrode 2 is joined to an upper edge of the hollow tube 1. However, the location of the ring electrode to be joined to the hollow tube is not limited to this. For example, the ring electrode may be joined to an intermediate area in a longitudinal direction of the hollow tube.

Further, the number of the ring electrode to be joined to the hollow tube is not limited, and two or more ring electrodes may be joined to the hollow tube.

FIG. 1 shows that two lead-out electrodes 3, 4 are joined to the ring electrode 2 so as to oppose each other. However, the number of the lead-out electrodes to be joined to the ring electrode and the location of the lead-out electrodes to be joined to the ring electrode are not limited to those shown in FIG. 1. For example, the number of lead-out electrode may be single, three or more.

In the present invention, the thick portion 21 of the ring electrode 2 may be made of a material other than platinum or a platinum alloy (hereinbelow, referred to as "another metallic material"). In this case, a thick portion 21 made of another metallic material is provided at an outer side of the core portion of electrode 20 made of platinum or a platinum alloy.

Another metallic material for the thick portion 21 can be selected widely from a metallic material having excellent heat resistance and conductive properties. Specifically, another metallic material may be copper, rhodium, molybdenum, tungsten, nickel, palladium, iron, chromium and an alloy containing such metal.

Among these metallic materials, rhodium, copper and an alloy containing such metal are preferred. When the thick portion 21 is made of copper or a copper alloy, the thick portion 21 may have a hollow structure. The thick portion 21 having a hollow structure permits the circulation of air or water in the thick portion 21 so that the electrode 2 can be cooled by air or water. An air-cooling system or a water-cooling system for the electrode 2 is preferable from the viewpoint of preventing local-overheating in the electrode 2. When the thick portion 21 has a hollow structure, the thick portion in the joint portion of the electrode 2 to the lead-out electrode 3 or 4 need not have a hollow structure. For such a structure that cross-sectional areas of materials in the joint portion do not change substantially, it is rather preferable that a thick portion 21 does not have a hollow structure in the joint portion between the electrode 2 and the lead-out electrode 3 or 4.

When a thick portion 21 made of another metallic material is employed, the core portion of electrode 20 and the thick portion 21 are prepared separately and they are joined by welding.

In the present invention, dimensions of the hollow tube, the ring electrode and the lead-out electrodes are not in particular limited. For example, in the hollow tube 1 shown in FIGS. 1 and 2, it is preferred that dimensions of the hollow tube 1, the electrode 2 and the lead-out electrodes 3, 4 are in the following ranges.

Hollow Tube 1

Radius d: 25 to 400 mm, more preferably, 40 to 300 mm

Length: 200 to 8,000 mm, more preferably, 400 to 3,000 mm

Wall thickness $t_0$: 0.2 to 5 mm, more preferably, 0.4 to 4 mm

Electrode 2
  Radius r: 40 to 800 mm, more preferably, 50 to 500 mm
  Width w of the thick portion 21: 3 to 300 mm, more preferably, 5 to 100 mm
  Width of the portions 22, 23: 10 to 500 mm, more preferably, 20 to 200 mm
  Width $w_1$ of the thin portion 24: 5 to 100 mm, more preferably, 5 to 40 mm
  Wall thickness $t_1$ of the thick portion 21: 2 to 20 mm, more preferably, 4 to 15 mm
  Wall thickness $t_2$ of the portion 22: 0.8 to 20 mm, more preferably, 1 to 5 mm
  Wall thickness $t_3$ of the portion 23: 1.2 to 25 mm, is more preferably, 2 to 20 mm
  Wall thickness $t_4$ of the thin portion 24: 0.2 to 10 mm, more preferably, 0.4 to 5 mm
Lead-Out Electrodes 3, 4
  Width (excluding the widened area in the sectorial shape): 10 to 300 mm, preferably, 4 to 15 mm
  Wall thickness t: 1 to 20 mm, more preferably, 4 to 15 mm In the present invention, platinum is used as the major constituent material for the hollow tube 1 and the ring electrode 2. Accordingly, the constituent material is not limited to platinum but it may be of a platinum alloy. Specifically, the platinum alloy may be a platinum-gold alloy or a platinum-rhodium alloy. Further, it may be a strengthened platinum in which a metal oxide is dispersed in platinum or a platinum alloy. In this description, a material of platinum or a platinum alloy includes a material of a strengthened platinum in which a metal oxide is dispersed in platinum or a platinum alloy. The metal oxide dispersed in a strengthened platinum may be a metal oxide in Group 3, Group 4 or Group 13 in the Periodic Chart, represented by $Al_2O_3$, $ZrO_2$ or $Y_2O_3$.

When the hollow tubular body of the present invention is employed as a conduit for molten glass, the hollow tube in which molten glass passes and the inner circumferential side of the core portion of electrode joined to the hollow tube (the thin portion 24 in the core portion of electrode 20 in FIG. 2) are particularly exposed to a high temperature. Accordingly, it is preferred, for the hollow tube and the part at the inner circumferential side of the core portion of electrode, to use a platinum alloy such as a platinum-gold alloy or platinum-rhodium alloy or a strengthened platinum in which a metal oxide is dispersed in a platinum alloy, each having excellent heat resistance. Since a platinum alloy such as a platinum-gold alloy or a platinum-rhodium alloy is expensive and has a larger electric resistance than platinum, the large calorific value is large at the time of conduction heating. Accordingly, when the core portion of electrode 20 has the structure as shown in FIG. 2, a platinum alloy or a strengthened platinum in which a metal oxide is dispersed in a platinum alloy is preferably employed for only the thin portion 24 occupying the inner circumferential portion of the core portion of electrode, and platinum or a strengthened platinum in which a metal oxide is dispersed in platinum is employed for the other portions of the core portion of electrode. When a platinum alloy is employed for the part at the inner circumferential side of the core portion of electrode and platinum is employed for the other portions, they are joined by welding after being prepared separately.

The material for the lead-out electrodes 3, 4 is preferably the same as the material for the thick portion 21 of the electrode 2. When the thick portion 21 is made of platinum or a platinum alloy, the lead-out electrodes 3, 4 are preferably of platinum or a platinum alloy. On the other hand, when the thick portion 21 is of another metallic material, the lead-out electrodes 3, 4 are preferably of another metallic material as mentioned above. However, the present invention is not limited to this. When the thick portion 21 is of platinum or a platinum alloy, the lead-out electrodes 3, 4 may be of another metallic material, or when the thick portion 21 is of a metallic material, the lead-out electrodes 3, 4 may be of platinum or a platinum alloy.

In the present invention, a known method may be employed to join the hollow tube to the ring electrode and to join the ring electrode to the lead-out electrodes. The hollow tube is joined to the ring electrode by welding for example. Although the ring electrode and the lead-out electrodes are preferably joined by welding, they may be joined by a mechanical joining system with use of a fixing member such as bolt, screw or the like.

In the glass manufacturing apparatus of the present invention, the hollow tubular body of the present invention is employed as a conduit for molten glass in which molten glass of high temperature is passed. In the glass manufacturing apparatus, the hollow tubular body of the present invention can be employed for, for example, the sub-atmospheric vessel, an uprising pipe and a downfalling pipe of a sub-atmospheric apparatus. Further, it can be employed as a discharge pipe for removing impurities from a glass manufacturing apparatus, a discharge pipe for discharging molten glass from a glass manufacturing apparatus into a molding die in a case that an optical element such as lens, prism or the like is molded.

EXAMPLE

In the following, the present invention will be explained in more detail with reference to Examples.

Example 1

In this example, a hollow tubular body as shown in FIGS. 1 to 3 was prepared, provided that another electrode 2 having the same shape as in FIG. 2 was joined to an lower edge of the hollow tube 1 and lead-out electrodes 3, 4 were joined to this electrode 2. The structural members were joined by welding. Dimensions and constituent materials of each of the structural members are as follows.

Hollow Tube 1
  Radius d: 61 mm,
  length: 650 mm,
  wall thickness $t_0$: 0.5 mm and
  constituent material: platinum-rhodium alloy (90% by mass of platinum and 10% by mass of rhodium)
Ring Electrode 2
  Radius r: 150 mm,
  width w of the thick portion 21: 10 mm,
  width of the portion 22 or 23: 60 mm,
  width $w_1$ of the thin portion 24: 20 mm,
  wall thickness $t_1$ of the thick portion 21: 8 mm,
  wall thickness $t_2$ of the portion 22: 2 mm,
  wall thickness $t_3$ of the portion 23: 4 mm,
  wall thickness $t_4$ of the thin portion 24: 0.5 mm,
  angle α: 110° and
  constituent material: the thin portion 24 was made of a platinum-rhodium alloy (90% by mass of platinum and 10% by mass of rhodium), and the other portions were made of platinum. The thin portion 24 was joined to the other portions by welding.

Lead-Out Electrodes 3, 4

Width (excluding the widened area of the sectorial shape): 40 mm,
wall thickness: 8 mm,
angle β: 120° and
constituent material: platinum-rhodium alloy (90% by mass of platinum and 10% by mass of rhodium)

The lead-out electrodes 3, 4 were connected to an external power source so that the electrode 2 at an upper edge of the hollow tube 1 was a positive pole and the electrode 2 at a lower edge of the hollow tube 1 was a negative pole, and conduction heating was carried out under the following conditions.

Voltage: 10 V,
current: 800 A and
heating period: 10 H

Temperatures of the electrodes 2 during the conduction heating were observed with a thermocouple. As a result, notable local-overheating was not recognized.

Comparative Example 1

A hollow tubular body was prepared in the same manner as Example 1, provided that electrodes and lead-out electrodes were joined to upper and lower edges, and the wall thickness of each of the electrodes 2 was constant (1 mm). Conduction heating was carried out in the same manner as Example 1. Notable local-overheating was recognized in the shortest path indicated by an arrow mark a in each electrode 2. After two hours from the initiation of the conduction heating, the electrodes 2 were fused in a portion in the vicinity of the shortest path indicated by an arrow mark a whereby electric conduction became impossible.

The hollow tubular body having a platinum or platinum alloy hollow tube of the present invention prevents local-overheating in the electrode for conduction heating. Accordingly, damage to the electrode for conduction heating due to a thermal stress is avoidable.

Since the glass manufacturing apparatus or the sub-atmospheric apparatus of the present invention employs the hollow tubular body of the present invention as a conduit for molten glass, damage to the electrode for conduction heating due to a thermal stress can be prevented. If such electrode is damaged, the conduit for molten glass can not be heated by conduction heating and a temperature difference generates between the molten glass and the conduit for molten glass whereby it is difficult to produce glass. Such problem can be eliminated by the glass manufacturing apparatus or the sub-atmospheric apparatus of the present invention. The hollow tubular body of the present invention is in particular useful for a glass manufacturing apparatus or a sub-atmospheric apparatus consuming possibly a very large quantity of current for conduction heating.

The entire disclosure of Japanese Patent Application No. 2005-169169 filed on Jun. 9, 2005 including specification, claims, drawings and summary is incorporated herein by reference in its entirety.

What is claimed is:

1. A hollow tubular body for conduction heating comprising:
a hollow tube made of one of platinum and a platinum alloy;
a ring electrode joined to an outer circumference portion of the hollow tube;
wherein the ring electrode comprises:
a core portion made of one of platinum and a platinum alloy and having an inner edge joined to the outer circumference portion of the hollow tube and an outer edge positioned radially outward of the inner edge, and
a thick portion made of one of platinum and a platinum alloy and provided at the outer edge of the core portion of the ring electrode; and
at least one lead-out electrode joined to the outer edge portion of the ring electrode.

2. A hollow tubular body for conduction heating comprising:
a hollow tube made of one of platinum and a platinum alloy;
a ring electrode joined to an outer circumference portion of the hollow tube,
wherein the ring electrode comprises:
a core portion made of one of platinum and a platinum alloy and having an inner edge joined to the outer circumference portion of the hollow tube and an outer edge positioned radially outward of the inner edge, and
a thick portion made of a metallic material other than platinum and a platinum alloy and provided at the outer edge of the core portion of the ring electrode; and
at least one lead-out electrode joined to the outer edge portion of the ring electrode.

3. The hollow tubular body according to claim 1 or 2, wherein the thick portion is provided over an entire circumference of the outer circumference portion of the ring electrode.

4. The hollow tubular body according to claim 1 or 2, wherein the thick portion satisfies formulas, $t_1=t_0$ to $20t_0$ and $w=0.02r$ to $0.3r$, where $t_1$ represents a wall thickness (mm) of the thick portion, $t_0$ represents a wall thickness (mm) of the hollow tube, w represents a width (mm) of the thick portion, and r represents a radius (mm) of the ring electrode.

5. The hollow tubular body according to claim 1 or 2, wherein the core portion of the ring electrode comprises a first thin portion in a joint portion to the lead-out electrode, the core portion of the ring electrode is connected to the lead-out electrode through the thick portion of the ring electrode in the joint portion, and said first thin portion has a smallest wall thickness in the core portion along a circumferential direction of the core portion of the ring electrode.

6. The hollow tubular body according to claim 5, wherein the first thin portion is located in an angular range α of from 10° to 90°, wherein the angular range α is defined with respect to a center line, extending from the center of the ring electrode through the midpoint of the joint portion to the lead-out electrode.

7. The hollow tubular body according to claim 5, wherein the core portion along a circumferential direction of the core portion of electrode satisfy formulas, $t_2=t_0$ to $5t_0$, $t_3=2t_0$ to $20t_0$ and $t_3>t_2$, where $t_0$ represents a wall thickness (mm) of the hollow tube, $t_2$ represents a wall thickness (mm) of the first thin portion and $t_3$ represents a wall thickness (mm) of the other portion along the circumferential direction of the core portion of electrode.

8. The hollow tubular body according to claim 7, wherein the core portion of the ring electrode further comprises a second thin portion over an entire circumference of the core portion in a joint portion to the hollow tube, and said second thin portion has a smallest wall thickness in the core portion of the ring electrode.

9. The hollow tubular body according to claim 8, wherein the second thin portion satisfies formulas, $t_4=0.7t_0$ to $2t_0$, $w_1=0.05r_1$ to $0.5r_1$ and $t_4<t_2<t_3$, where $t_4$ represents a wall thickness (mm) of the second thin portion, $t_0$ represents a wall thickness (mm) of the hollow tube, $w_1$ represents a width (mm) of the second thin portion and $r_1$ represents a radius (mm) of an opening provided at the center of the ring electrode.

10. The hollow tubular body according to claim 1 or 2, wherein an angle β defined by an edge of a joint portion, extending to the lead-out electrode with respect to the ring electrode is from 110° to not more than 180°.

11. The hollow tubular body according to claim 1 or 2, wherein a difference between a wall thickness of the ring electrode and a wall thickness of the lead-out electrode in a joint portion is not more than 50% of the wall thickness of the ring electrode or the wall thickness of the lead-out electrode, whichever greater.

12. A molten glass manufacturing apparatus comprising a hollow tubular body according to claim 1 or 2, as at least one of a pipe connected to a molten glass outlet, a discharge pipe for removing impurities from a glass manufacturing apparatus, an uprising pipe and a downfalling pipe of a sub-atmospheric apparatus, and a discharge pipe for discharging molten glass from a glass manufacturing apparatus into a molding die.

13. A method for heating a hollow tubular body, comprising:

providing a hollow tubular body according to claim 1 or 2; and carrying out conduction heating of the hollow tubular body.

* * * * *